(12) United States Patent
Bhatti

(10) Patent No.: US 6,814,511 B2
(45) Date of Patent: Nov. 9, 2004

(54) PRINTING INFORMATION SAVED IN PRINT-READY FORMATS

(75) Inventor: Kristen L. Bhatti, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/993,598

(22) Filed: Nov. 27, 2001

(65) Prior Publication Data

US 2003/0097948 A1 May 29, 2003

(51) Int. Cl.[7] .......................... B41J 11/44; G06F 15/00
(52) U.S. Cl. ............................................. 400/76; 358/1.15
(58) Field of Search .......................... 400/61, 71, 76, 400/70; 358/1.1, 1.9, 1.15, 1.16, 1.17, 1.18; 707/100, 101, 102; 101/484

(56) References Cited

U.S. PATENT DOCUMENTS

| | | | | |
|---|---|---|---|---|
| 4,825,405 A | * | 4/1989 | Makino et al. | 400/61 |
| 6,089,765 A | * | 7/2000 | Mori | 400/61 |
| 2001/0043358 A1 | * | 11/2001 | Schwartz | 358/1.15 |
| 2002/0048041 A1 | * | 4/2002 | Housel et al. | 358/1.15 |
| 2002/0059272 A1 | * | 5/2002 | Porter | 707/100 |
| 2002/0101614 A1 | * | 8/2002 | Imes | 358/1.18 |
| 2002/0165882 A1 | * | 11/2002 | Zettel et al. | 707/530 |

* cited by examiner

*Primary Examiner*—Anjan Deb
*Assistant Examiner*—Hoai-An D. Nguyen (57) ABSTRACT

Print systems are provided. A representative print system includes a job retention system. The job retention system is configured to receive an input corresponding to a selected portion of a print task and retrieve information corresponding to the selected portion of the print task. Preferably, the information is in a print-ready format that is configured for use by a printing device. So configured, the information can be retrieved from memory and printed by the printing device without being processed by a driver of the printing device. Additionally, the job retention system is configured to enable the selected portion of the print task to be printed without printing a non-selected portion of the print task. Methods and other systems also are provided.

31 Claims, 10 Drawing Sheets

PRINTING INFORMATION SAVED IN PRINT-READY FORMATS

FIELD OF THE INVENTION

The present invention generally relates to printing. More specifically, the invention relates to systems and methods for printing information that is provided in a print-ready format.

DESCRIPTION OF THE RELATED ART

Computer networking has done much to improve worker efficiency and productivity. From a hardware perspective, computer networking also can reduce costs. In particular, by networking a hardware resource, such as printing device, multiple workers can effectively share the hardware resource.

Computer networking can, however, present one or more drawbacks. Take, for instance, the scenario where a computer network is established to enable multiple workers to use a single printing device. Such a printing device could be located a relatively long distance from at least one of the workers. When one of these workers sends a print task to the printing device, such as by interfacing with a printer driver associated with their workstation, the worker typically walks from their workstation to the printing device in order to retrieve the requested documents. If the worker only requested one copy of the document to be printed and, then, upon reaching the printing device realized that multiple copies actually were required, the worker typically must return to the workstation to request printing of additional copies. More specifically, the worker would interface with the printer driver once again to request the additional copies and then return to the printing device to retrieve the copies. Clearly, the aforementioned process for printing and then retrieving the additional copies can be somewhat time-consuming, particularly when the distance between the printing device and the workstation is long.

Based on the foregoing, it should be appreciated that there is a need for improved systems and methods that address these and/or other shortcomings of the prior art.

SUMMARY OF THE INVENTION

The present invention relates to systems and methods for printing information that is provided in a print-ready format. In this regard, an embodiment of one such method includes: storing information corresponding to a print task in memory in a print-ready format, the information in the print-ready format being configured for use by a printing device such that the information can be printed by the printing device without being processed by a driver of the printing device; and enabling a selected portion of the print task to be printed without printing a non-selected portion of the print task.

An embodiment of a print system of the invention includes a job retention system. The job retention system is configured to receive an input corresponding to a selected portion of a print task and retrieve information corresponding to the selected portion of the print task. Preferably, the information is in a print-ready format that is configured for use by a printing device. So configured, the information can be retrieved from memory and printed by the printing device without being processed by a driver of the printing device. Additionally, the job retention system is configured to enable the selected portion of the print task to be printed without printing a non-selected portion of the print task.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

As will be described in greater detail herein, print systems and methods of the present invention potentially enable a user to print a specific portion or portions of stored information without having to print all of the stored information. In particular, in some embodiments, information (e.g., a print-ready file) can be stored in memory associated with a printing device. Preferably, the user is enabled to identify one or more portions of the stored information, e.g., one or more pages, so the printing device can print only the identified information. In this manner, all of the information stored in memory does not have to be printed when the user only desires printing of a selected portion(s) of the information.

Figure 1:
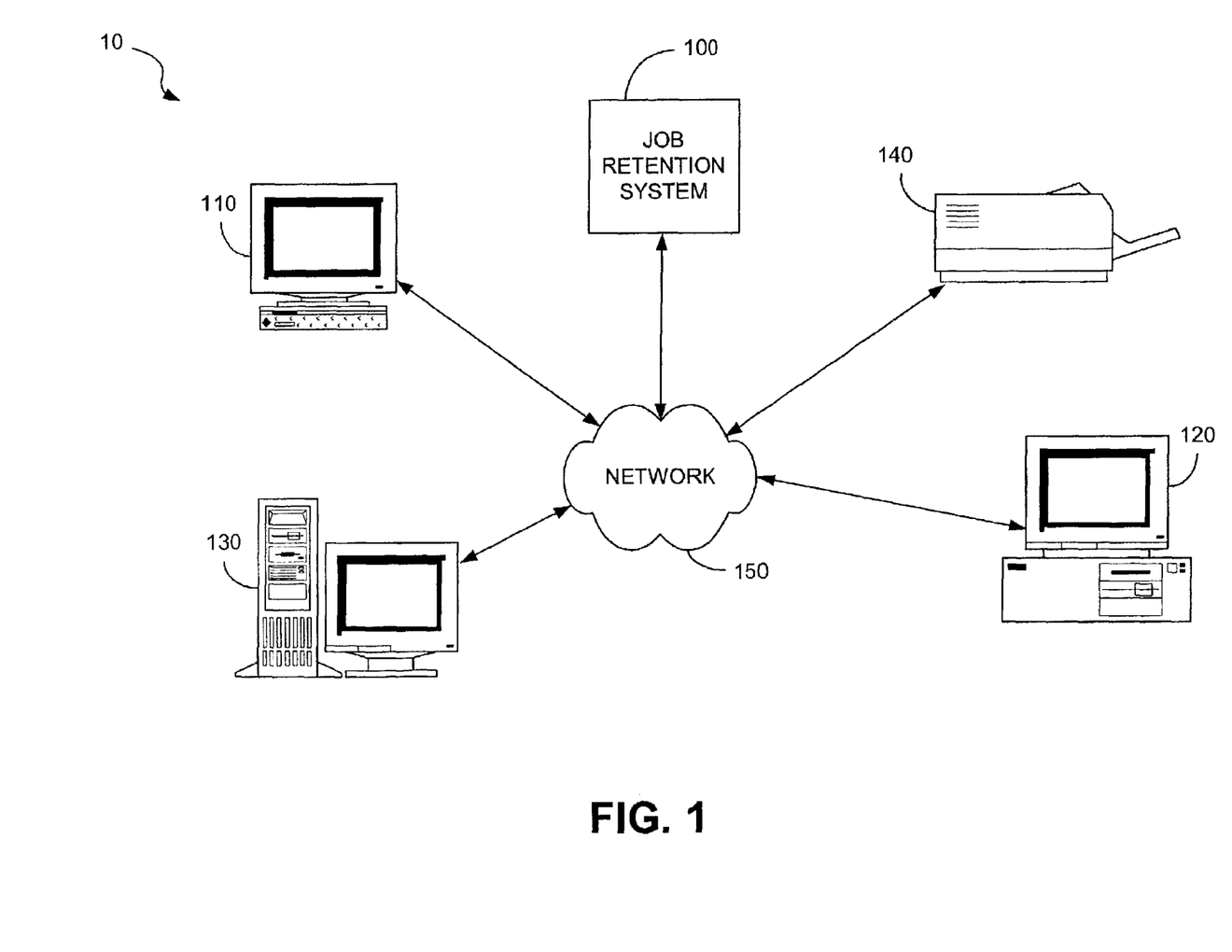
FIG. 1 is a schematic diagram depicting an embodiment of the print system of the present invention.

Reference will now be made to the schematic diagram of FIG. 1, which depicts an embodiment of a print system 10 of the present invention. As shown in FIG. 1, print system 10 includes a job retention system 100 that can be associated with a network device, such as a printing device. As used herein, the term "printing device" refers to a device or combination of devices that are adapted to print information. In this regard, printers, multi-function devices and facsimile machines are considered non-limiting examples of printing devices.

Typically, print system 10 includes at least one network device that is able to provide information corresponding to a print task to the job retention system, and at least one printing device that is able to print information associated with the print task. In FIG. 1, multiple network devices are depicted. More specifically, print system 10 of FIG. 1 includes workstations 110 and 120, and server 130, each of which can be configured to provide information corresponding to a print task to the job retention system. A printing device 140, which is able to print information associated with the print task, also is included. Each of the devices 110–140 is communicatively coupled to a network 150.

Network 150 may be any type of communication network employing any network topology, transmission medium, or network protocol. For example, network 150 may be any public or private packet-switched or other data network, including the Internet, circuit-switched networks, such as the public switched telephone network (PSTN), wireless network, or any other desired communications infrastructure and/or combination of infrastructures. Typically, however, network 150 is configured as an intranet.

Figure 2:
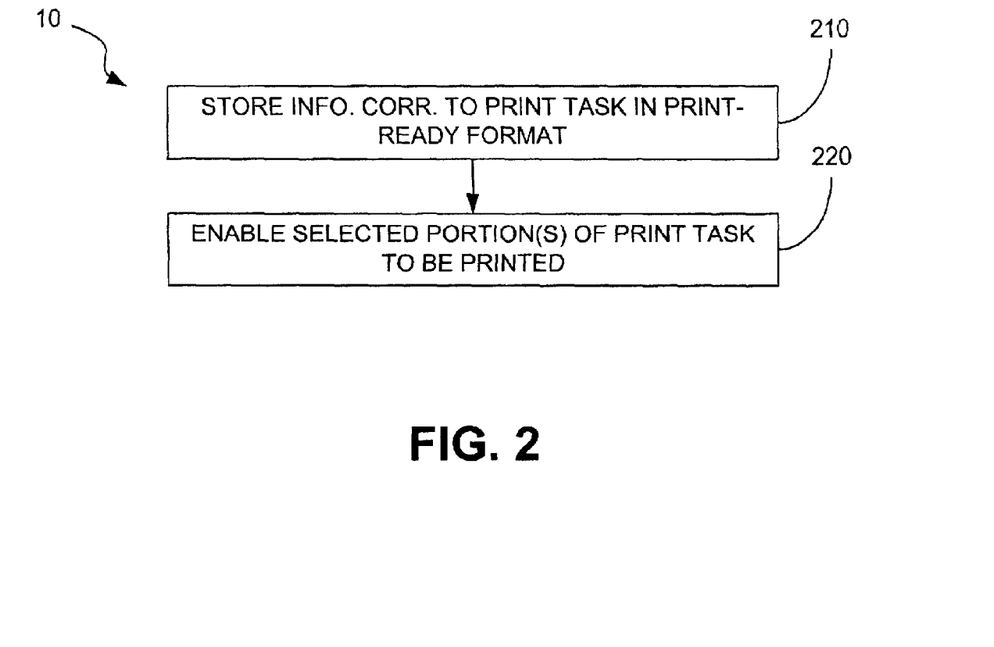
FIG. 2 is a flowchart depicting operation of the embodiment of the print system depicted in FIG. 1.

Functionality of the embodiment of print system 10 of FIG. 1 is depicted in the flowchart of FIG. 2. As shown in FIG. 2, the print system or method 10 may be construed as beginning at block 210, where information corresponding to a print task is stored. Preferably, the information is stored in a print-ready format, i.e., the information has been configured for use with a printing device. For instance, the information corresponding to the print task could be formatted by use of a driver associated with the printing device. Therefore, the information could be retrieved from memory and printed by a printing device without having to be processed by a driver.

In block 220, a selected portion of the print task is enabled to be printed. Typically, printing of the selected portion of the print task is accomplished by the printing device associated with job retention system 100. In some embodiments, this is also the printing device associated with storing the information in the print-ready format.

Figure 3:
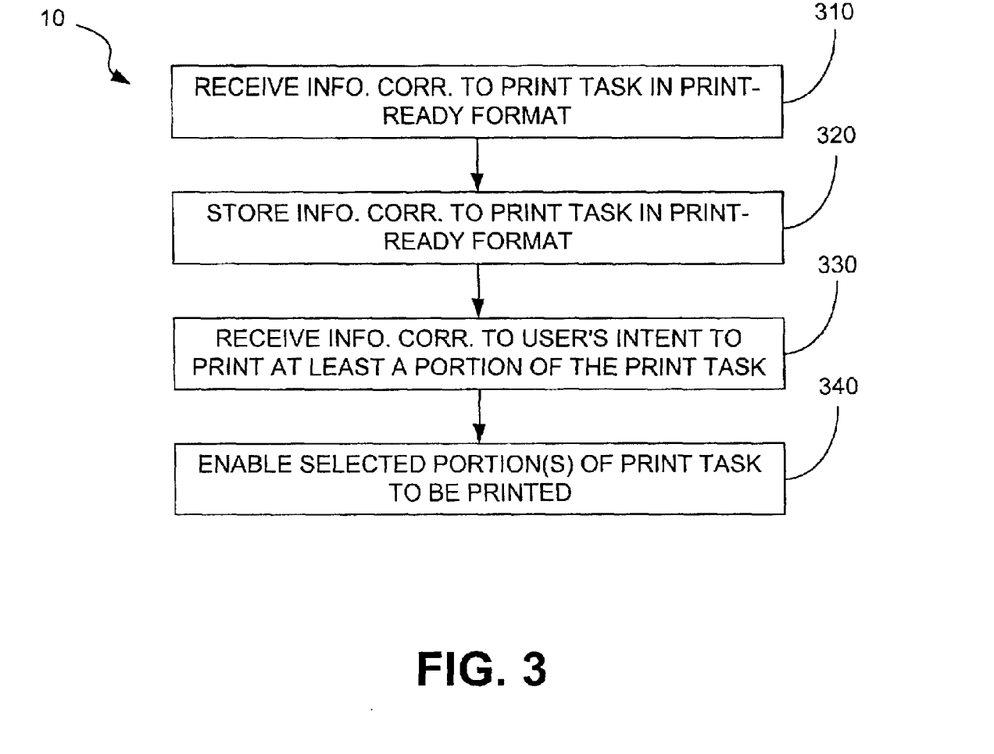
FIG. 3 is a flowchart depicting functionality of an alternative embodiment of the print system of the present invention.

Functionality of another embodiment of print system 10 is depicted in FIG. 3. In FIG. 3, print system or method 10 may be construed as beginning at block 310, where information corresponding to a print task is received. In block 320, the information corresponding to the print task is stored in memory. Preferably, the information corresponding to the print task is provided in a print-ready format and is stored in memory associated with a printing device. For example, the information can be stored by a hard disk or any other memory storage device of the printing device. Proceeding to block 330, information corresponding to a user's intent to print only a portion of the print task is received. In block 340, the selected portion of the print task is enabled to be printed.

As will be described in detail below, at least some of the functionality described in relation to print system 10 can be facilitated by job retention system 100 (FIG. 1). In this regard, job retention system 100 can be implemented in software, firmware, hardware, or a combination thereof. When implemented in software, job retention system 100 can be a program that is executable by a digital computer or processor-based device ("computer"), an example of which is depicted schematically in FIG. 4.

Figure 4:
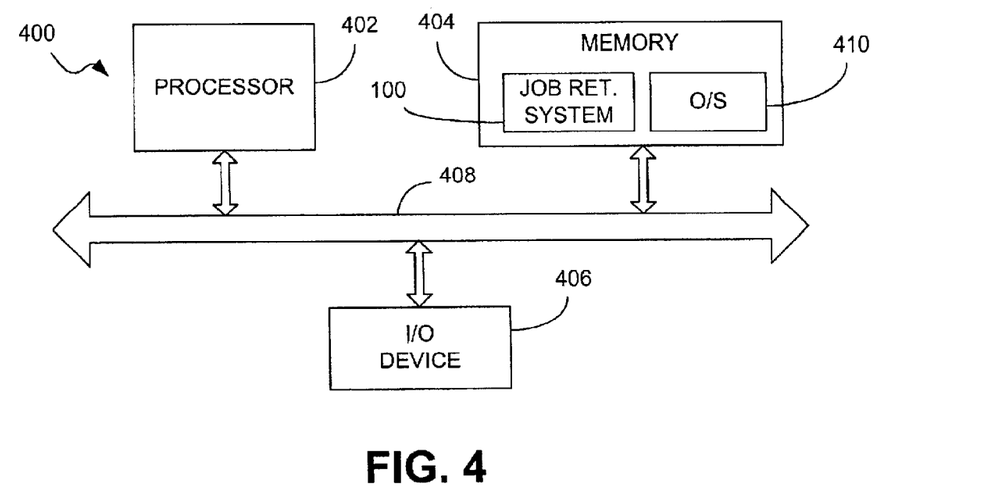
FIG. 4 is a schematic diagram depicting a computer or processor-based system that can be used to implement the job retention system of FIG. 1.

Generally, in terms of hardware architecture, computer 400 of FIG. 4 includes a processor 402, memory 404, and one or more input and/or output (I/O) devices 406 (or peripherals) that are communicatively coupled via a local interface 408. Local interface 408 can be, for example, one or more buses or other wired or wireless connections, as is known in the art. Local interface 408 can include additional elements, which are omitted for ease of description. These additional elements can be controllers, buffers (caches), drivers, repeaters, and/or receivers, for example. Further, the local interface may include-address, control, and/or data connections to enable appropriate communications among the components of computer 400.

Processor 402 can be a hardware device configured to execute software that can be stored in memory 404. Processor 402 can be any custom made or commercially available processor, a central processing unit (CPU) or an auxiliary processor among several processors. Additionally, the processor can be a semiconductor-based microprocessor (in the form of a microchip), for example.

Memory 404 can include any combination of volatile memory elements (e.g., random access memory (RAM, such as DRAM, SRAM, etc.)) and/or nonvolatile memory elements (e.g., ROM, hard drive, tape, CDROM, etc.). Moreover, memory 404 can incorporate electronic, magnetic, optical, and/or other types of storage media. Note that memory 404 can have a distributed architecture, where various components are situated remote from one another, but can be accessed by processor 402.

The software in memory 404 can include one or more separate programs, each of which comprises an ordered listing of executable instructions for implementing logical functions. The software in the memory 404 includes job retention system 100 and a suitable operating system (O/S) 410. The operating system 410 controls the execution of other computer programs, such as job retention system 100. Operating system 310 also can provide scheduling, input-output control, file and data management, memory management, and communication control and related services.

The I/O device(s) 406 can include input devices, such as a keypad and/or a receiver, for example. I/O device(s) 406 also can include output devices, such as a display device, a printing mechanism(s) and/or a transmitter, for example. I/O device(s) 406 may further include devices that are configured to communicate both inputs and outputs, such as a network communication port, for example.

When the computer 400 is in operation, processor 402 is configured to execute software stored within the memory 404, communicate data to and from the memory 404, and generally control operations of the computer 400. Job retention system 100 and the O/S 410, in whole or in part, are read by the processor 402, perhaps buffered within processor 402, and then executed.

When job retention system 100 is implemented in software, it should be noted that the remote print system can be stored on any computer readable medium for use by or in connection with any computer-related system or method. In the context of this document, a computer-readable medium is an electronic, magnetic, optical, or other physical device or means that can contain or store a computer program for use by or in connection with a computer-related system or method. Job retention system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

When implemented in hardware, job retention system 100 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

Reference will now be made to the flowchart of FIG. 5, which depicts the functionality of a representative embodiment of job retention system 100. In this regard, each block of the flowchart represents a module segment or portion of code that comprises one or more executable instructions, or logic for implementing the specified logical function(s). It should also be noted that in some alternative implementations the functions noted in various blocks of FIG. 5, or any other of the flowcharts herein, may occur out of the order in which they are depicted. For example, two blocks shown in succession in FIG. 5 may, in fact, be executed substantially concurrently. In other embodiments, the blocks may sometimes be executed in the reverse order depending upon the functionality involved.

Figure 5:
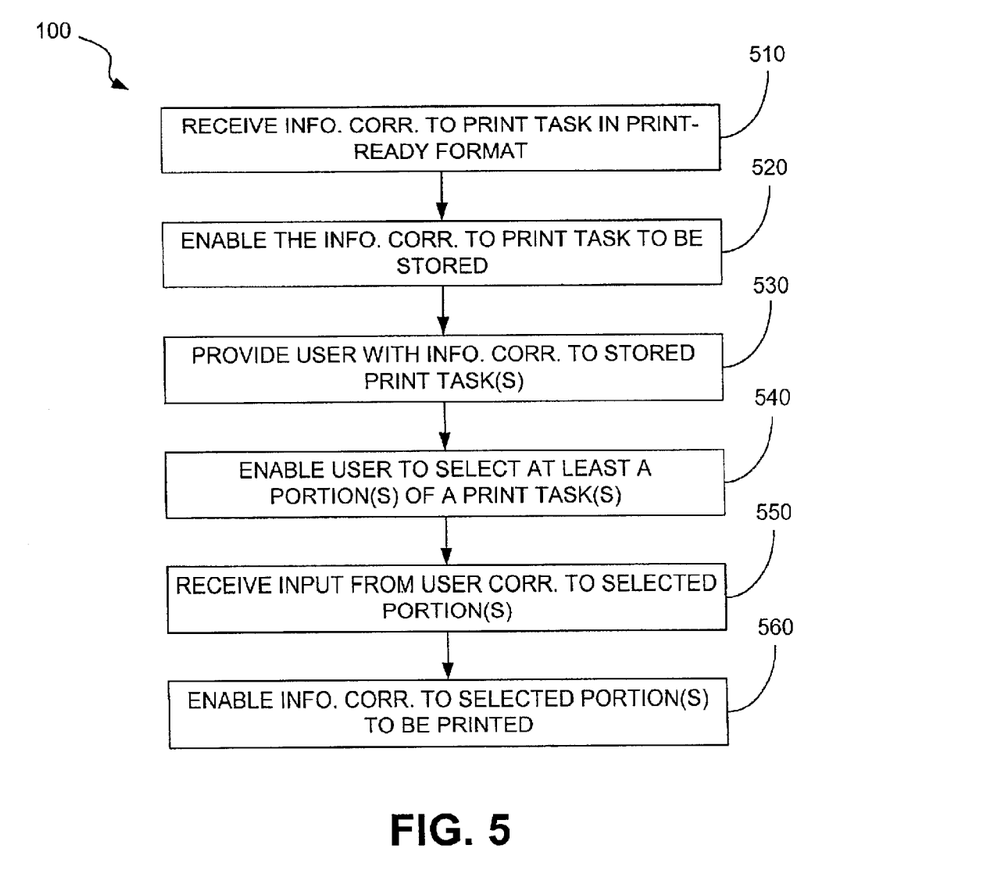
FIG. 5 is a flowchart depicting functionality of an embodiment of the job retention system of the present invention.

As shown in the flowchart of FIG. 5, job retention system or method 100 may be construed as beginning at block 510, where information corresponding to a print task is received. More specifically, the information can correspond to a file(s). In block 520, the information corresponding to the print task is enabled to be stored. Typically, the information corresponding to the print task is stored in memory associated with the printing device with which the user intends to print the print task. However, the information could be stored in a memory device not directly associated with the printing device, in which case, the memory storage device should be configured to communicate the information to a printing device. Additionally, the information corresponding to the print task preferably is provided in a print-ready format. In particular, the information preferably has been reconfigured by a printer driver associated with the printing device and/or otherwise reconfigured prior to being stored.

In block 530, a user is provided with information corresponding to the existence of the stored print task(s). In some embodiments, this can be accomplished by providing information to the user via a display device, e.g., a display device of the printing device. Such a display device could display a file name(s) or other indicia of the stored print task(s). In block 540, the user can be enabled to select at least a portion of a print task that the user intends to print. In some embodiments, this also can be accomplished via a display device, such as when the display device enables actuation via touch-screen actuation. In such an embodiment, the user could identify the print task and then can be prompted to enter information corresponding to the particular portion or portions that are to be printed. In block 550, input corresponding to the portion(s) to be printed is received. Thereafter, such as depicted in block 560, information corresponding to the selected portion(s) can be provided to the print mechanism of the printing device so that the selected portion(s) can be printed.

Figure 6:
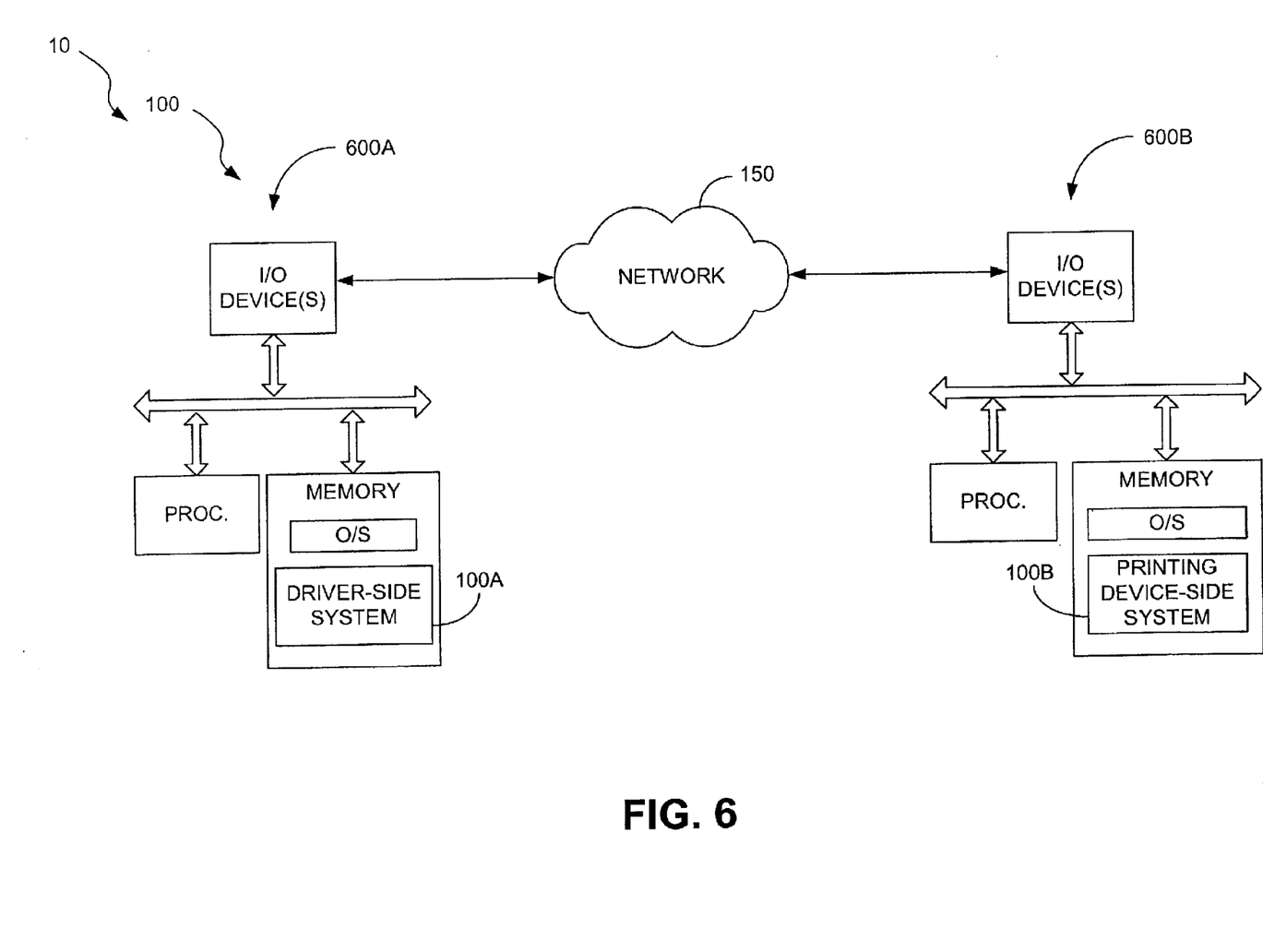
FIG. 6 is a schematic diagram depicting a computer or processor-based device that can be used to implement an alternative embodiment of the job retention system of the present invention.

Another embodiment of print system 10 is depicted schematically in FIG. 6. In FIG. 6, print system 10 includes a job retention system 100, the functionality of which is implemented via a driver-side system 100A and a printing device-side system 100B. Each of the driver-side system 100A and printing device-side system 100B can be implemented in hardware, firmware, software or a combination thereof. In particular, when implemented as software, the driver-side system 100A and printing device-side system 100B each can be associated with a computer or processor-based device, e.g., devices 600A and 600B, respectively, each of which may be similar to that described in relation to computer 400 of FIG. 4. For ease of description, such a device will not be described in detail again. However, it should be noted that driver-side system 100A typically is associated with a user workstation or other network device that is able to communicate information corresponding to a print task, and printing device-side system 100B typically is associated with a printing device. As shown in FIG. 6, these devices communicate via network 150.

Figure 7:
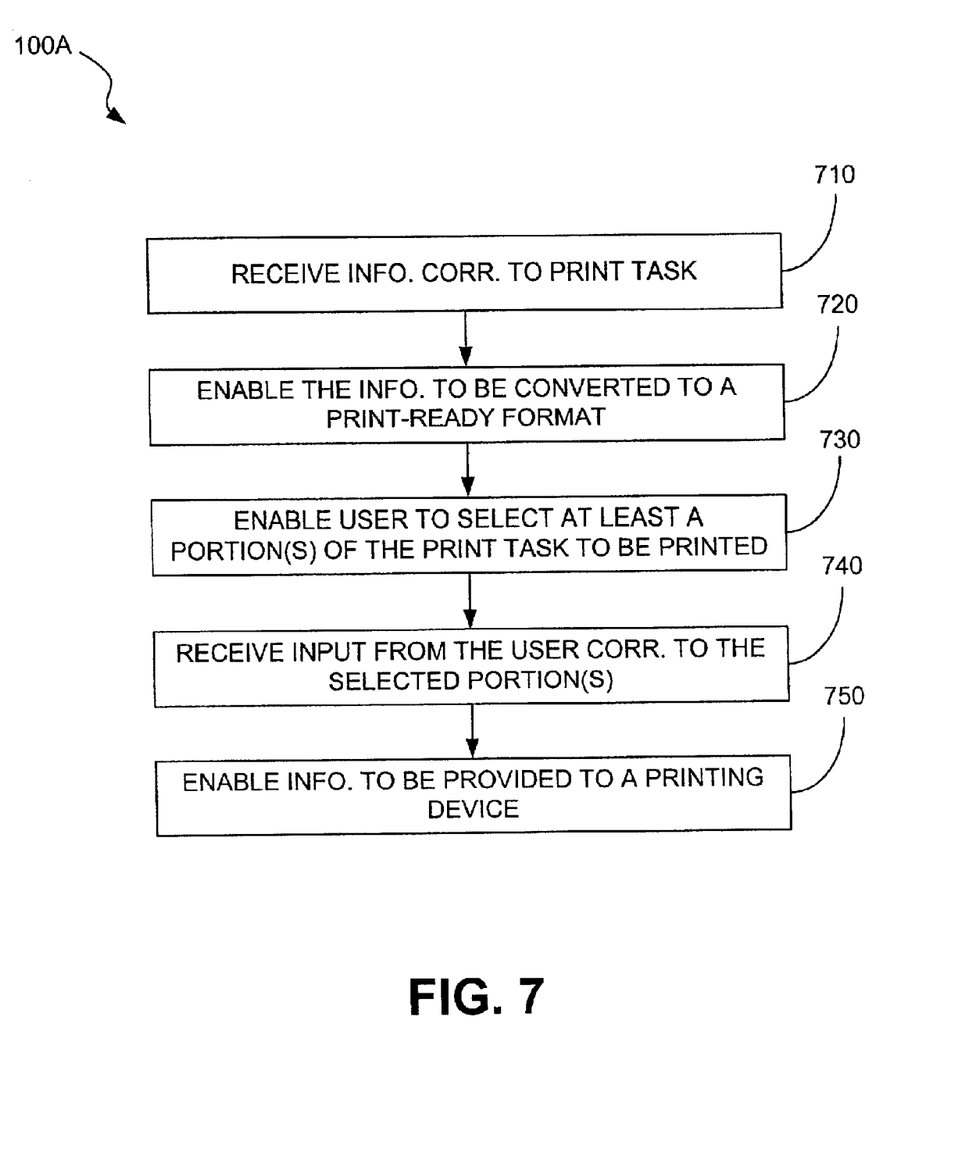
FIG. 7 is a flowchart depicting functionality of the job retention system of FIG. 6.

Functionality of the embodiments of the driver-side system 100A and printing device-side system 100B of FIG. 6 will now be described with reference to the flowcharts of FIGS. 7 and 9 respectively. As shown in FIG. 7, the driver-side system or method 100A may be construed as beginning at block 710, where information corresponding to a print task is received. In block 720, the information corresponding to the print task is enabled to be converted to print-ready data. This can be accomplished by a printer driver, which may be associated with the driver-side system 100A.

In block 730, the user is enabled to select one or more portions of the print task that are to be printed. In some embodiments, selection of one or more portions can be accomplished by use of a graphical user interface, such as depicted in FIG. 8.

Figure 8:
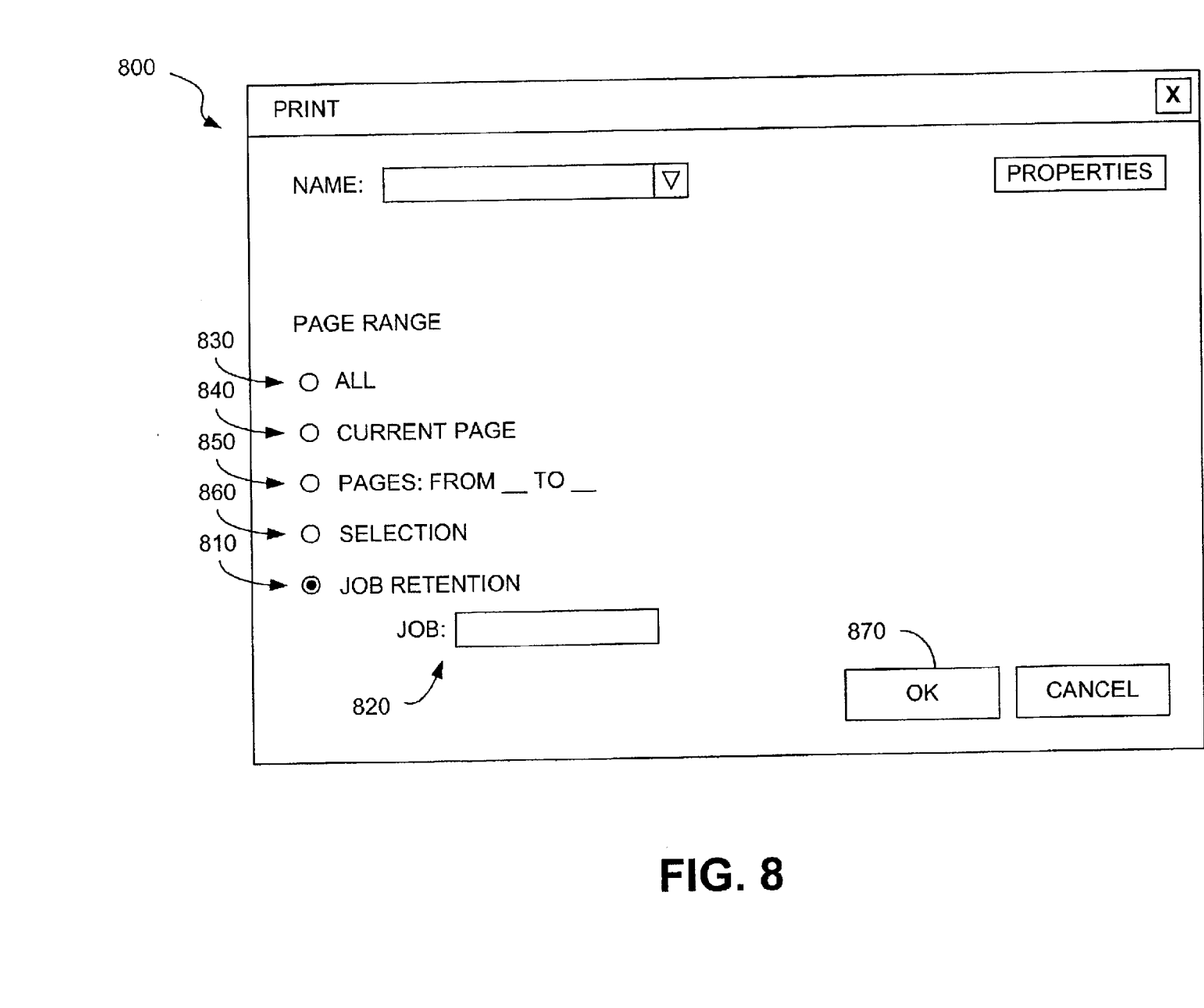
FIG. 8 is a schematic diagram depicting a representative embodiment of a graphical user interface of the job retention system of FIG. 6.

As shown in FIG. 8, graphical user interface (GUI) 800 includes a "JOB RETENTION" icon or actuator 810 and a "Job" field 820, which can be used to enable a user to identify information to be printed. As mentioned before, the information could be stored, or intended for storage, in a print-ready format. For example, when a user intends to print information that is stored by, or is otherwise associated with, the job retention system, the user can actuate the actuator 810. The user can then identify the information to be printed by filling in the field 820 with an appropriate identifier or address associated with the information, e.g., a file name. The portion(s) of the information to be printed can be identified by using the actuators 830–860. More specifically, actuating 830 enables all of the information to be printed, actuating 840 enables a current page to be printed, actuating 850 enables an identified range of pages to be printed, and 860 enables a selected portion of the information to be printed.

Returning to the flowchart of FIG. 7, once the user is enabled to select one or more portions that are to be printed, information corresponding to the user's intent to print one or more portions is received (block 740). In some embodiments, this also can be accomplished via a graphical user interface, such as that depicted in FIG. 8. For instance, this could be initiated by the user actuating the "OK" icon 870. In block 750, information corresponding to the portion or portions of information to be printed can be provided to the printing device in a print-ready format. By so doing, the selected information can be printed by the printing device. Additionally, the selected information and/or the entire file(s) from which the information is selected can be stored in memory, e.g., memory associated with the printing device. Therefore, if the user desires to print at least a portion of the print-ready information that is now stored in memory, the user may only need to interact with the printing device, i.e., the printing device-side system 100B.

Figure 9:
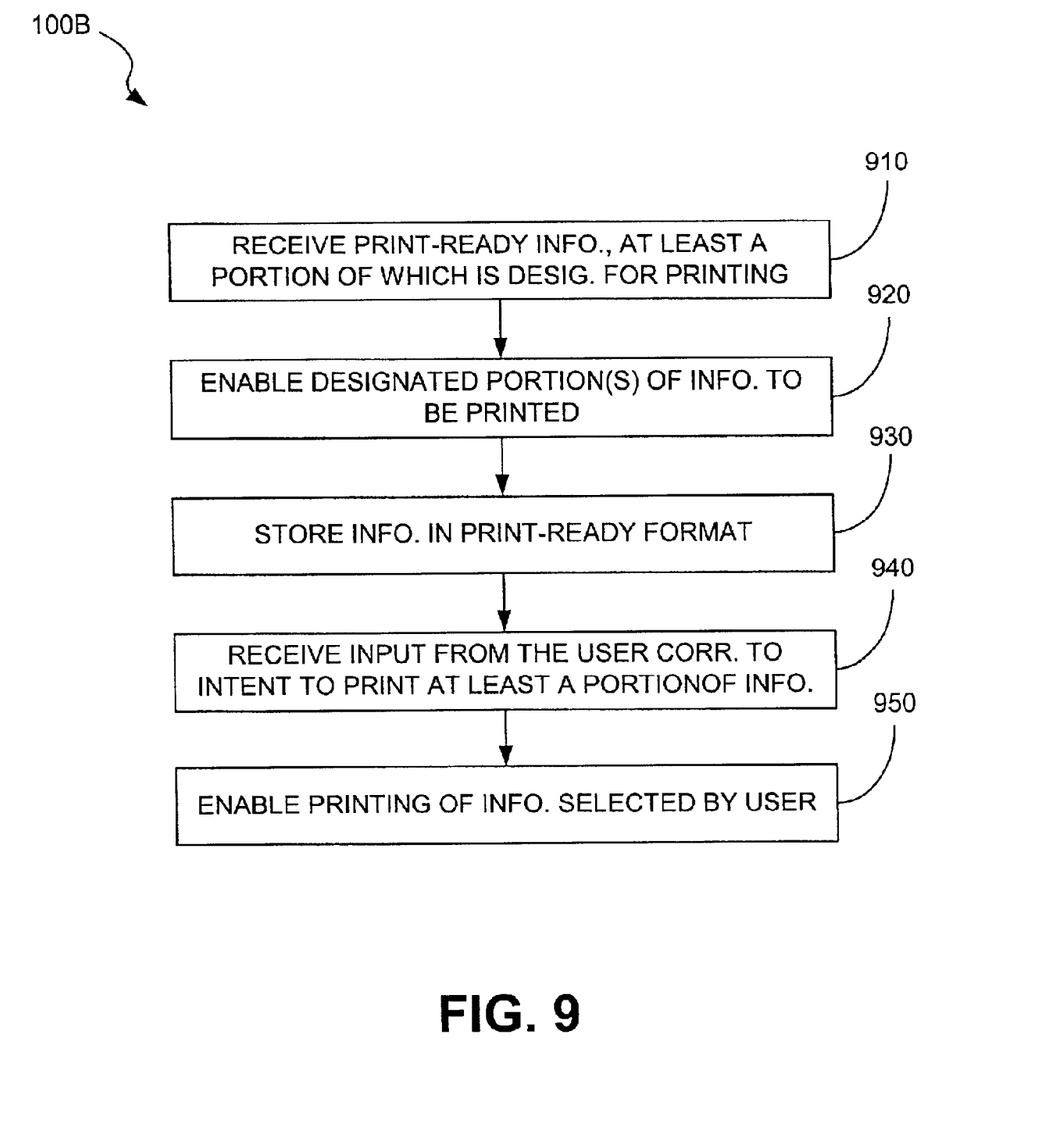
FIG. 9 is a flowchart depicting functionality of the job retention system of FIG. 6.

Referring now to the flowchart of FIG. 9, the functionality of the printing device-side system or method 100B maybe construed as beginning at block 910, where print-ready information is received. Preferably, the print-ready information includes a designation of that portion or portions which the user intends to have printed. In block 920, the designated portion or portions to be printed are enabled to be printed by the printing device. In block 930, information corresponding to the entire print task, e.g., the file(s) with which the portion(s) is associated, can be stored so that the entire print task and/or selected portions of the print task can be printed, if desire, by interacting with the printing device-side system. This is depicted in blocks 940 and 950.

In those embodiments where received print-ready information does not include a designation of the portion(s) that the user intends to have printed, the designation can be made separately by the user. In particular, the designation can be performed by the user at the printing device or other device associated with the printing device-side system 100B. A representative graphical user interface (GUI) 1000 that can be used for designating a portion(s) of a job to be printed is depicted schematically in FIG. 10.

Figure 10:
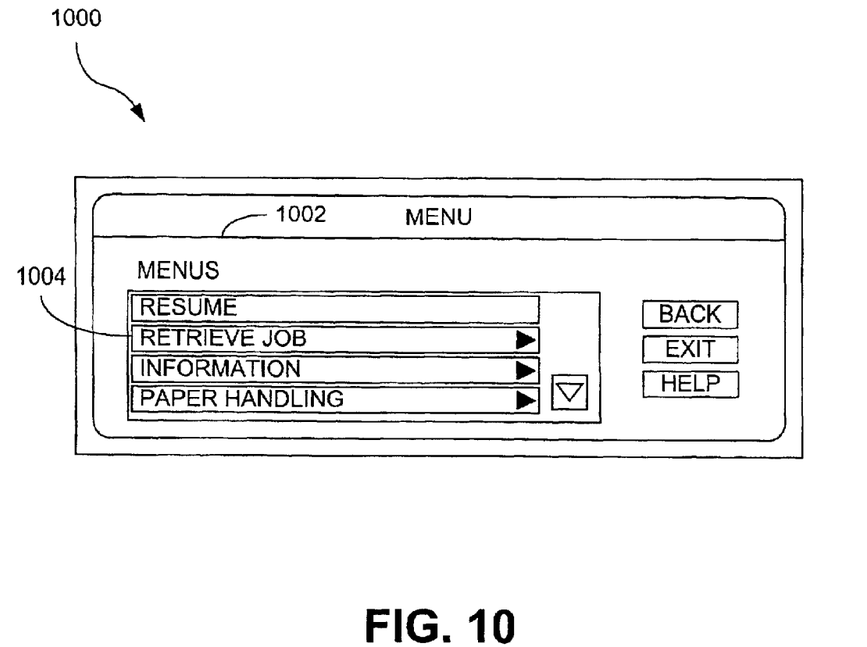
FIG. 10 is a schematic diagram depicting a representative embodiment of a graphical user interface (GUI) of the printing device-side system of FIG. 6.

As shown in FIG. 10, GUI 1000 can provide a user with a menu 1002 that includes indicia of sub-menus from which to choose. For example, GUI 1000 includes a "retrieve job" sub-menu, represented by "retrieve job" icon 1004. Upon selecting icon 1004, which can be enabled by touch-screen techniques or a hardware actuator, for example, a corresponding sub-menu can be displayed to the user. Such a sub-menu, i.e., submenu 1102, is depicted in FIG. 11.

Figure 11:
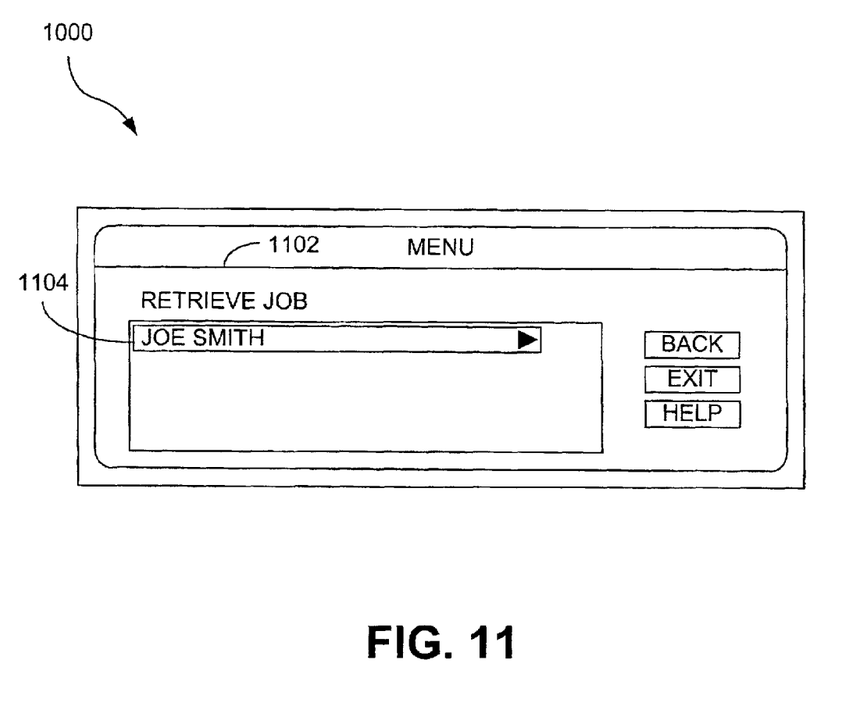
FIG. 11 is a schematic diagram depicting a sub-menu of the GUI of FIG. 10.
Figure 12:
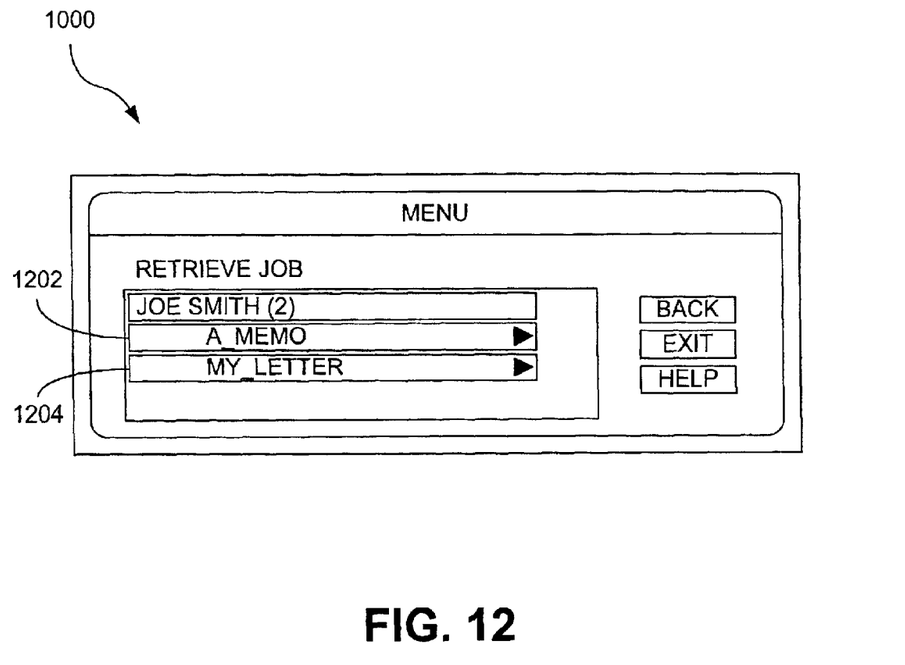
FIG. 12 is a schematic diagram depicting another sub-menu of the GUI of FIG. 10.

In FIG. 11, sub-menu 1102 includes a category that is represented by icon 1104. By way of example, the category or categories depicted in sub-menu 1102 can be used to organize groupings of jobs. Thus, in this example, icon 1104 is associated with jobs related to "Joe Smith." Upon actuating icon 1104, the user is provided with a display of particular jobs associated with icon 1104. For instance, as depicted in FIG. 12, a first job (depicted by icon 1202) and a second job (depicted by icon 1204) are available for a user to select.

Figure 13:
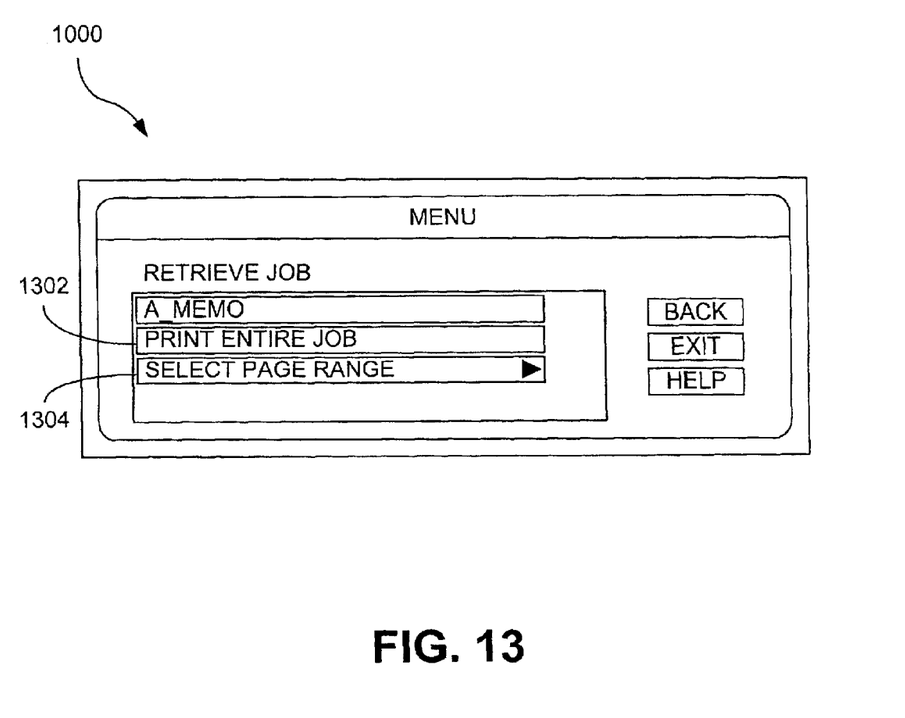
FIG. 13 is a schematic diagram depicting another sub-menu of the GUI of FIG. 10.
Figure 14:
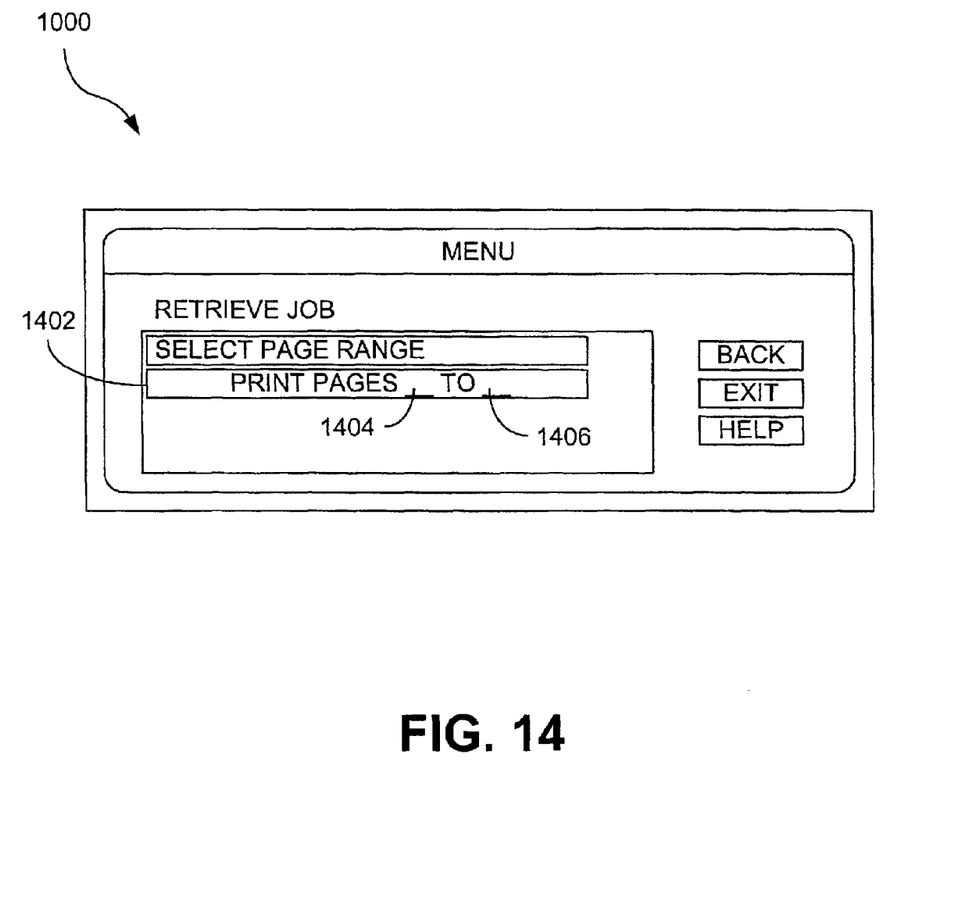
FIG. 14 is a schematic diagram depicting another sub-menu of the GUI of FIG. 10.

Referring now to FIG. 13, when job 1202 is selected, the user can be provided with one or more options pertaining to how the job is to be printed. In particular, the embodiment depicted in FIG. 13 provides a "print entire job" icon 1302 and a "select page range" icon 1304. More specifically, if a user actuates icon 1302, the entire print job is printed by the printing device. If, however, the user selects icon 1304, the user preferably is enabled to provide information corresponding to a range of pages to be printed. As shown in FIG. 14, this can be accomplished by entering the desired range in association with region 1402. By way of example, the user can provide an appropriate first input, such as via a keypad, so that a first page designated for printing becomes associated with region 1404 and, similarly, a second page becomes associated with region 1406. Once entered, the selected page or pages of the job can be printed.

Clearly, various techniques can be used to implement the functionality depicted in FIGS. 10 through 14. For instance, one or more of touch-screen actuation techniques, voice recognition, and actuator (keypad) entry, among others, can be used to enable a user to operate a graphical user interface and/or other components for selecting pages of a job that are to be printed.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims.

What is claimed is:

1. A method for printing information comprising:

storing information corresponding to a print task in memory in a print-ready format, such that information in the print-ready format can be printed by a printing device without being processed by a driver;

selecting a portion of the information the print-ready format; and enabling the selected portion of the information in the print-ready format to be printed without printing a non-selected portion of the information in the print-ready format.

2. The method of claim 1, further comprising:

providing a printing device; and printing the selected portion of the information in the print-ready format using the printing device.

3. The method of claim 2, wherein storing information comprises:

storing the information in the print-ready format in memory associated with the printing device.

4. The method of claim 1, further comprising:

receiving an input corresponding to a users's intent to print only a portion of the information in the print-ready format; and enabling only the selected portion of the information in the print-ready format to be printed.

5. The method of claim 4, further comprising:

receiving an input corresponding to a users's intent to print the entire information the print-ready format; and enabling the entire information in the print-ready format to be printed.

6. The method of claim 4, further comprising:

enabling the user to select at least the portion of the information in the print-ready format to be printed.

7. The method of claim 6, wherein the printing device has a user interface; and wherein enabling the user to select at least the portion of the information in the print-ready format comprises:

enabling the user to select at least the portion of the information in the print-ready format via the user interface.

8. The method of claim 7, wherein the user interface is a graphical user interface.

9. The method of claim 6, further comprising:
providing a driver, the driver being configured to receive information and configure the information in the print-ready format, the driver being further configured to provide a graphical user interface; and
wherein enabling the user to select at least the portion of the information in the print-ready format comprises:
enabling the user to select at least the portion of the information in the print-ready format via the graphical user interface.

10. The method of claim 1, wherein the selected portion of the print-ready information defines a page of the print task.

11. The method of claim 1, wherein the selected portion of the print-ready information defines a range of pages of the print task.

12. The method of claim 1, wherein the storing information corresponding to a print task in memory in a print-ready format further comprises:
storing a collection of information in the print-ready format corresponding to a plurality of print tasks in the memory.

13. The method of claim 1, wherein the memory is resident on the printing device, and wherein the storing step further comprises storing the information in print-ready format in the memory.

14. The method of claim 1, wherein the printing device has an input interface, the method further comprising the step of:
receiving, via the input interface, an input for selecting the selected portion of the information in print-ready format.

15. The method of claim 14, further comprising the step of printing, in response to the input, the selected portion without printing the non-selected portion.

16. A print system comprising:
a job retention system configured to store print-ready information corresponding to a print task and to receive an input corresponding to a selected portion of the print-ready information, the print-ready information being configured for use by a printing device such that the information can be printed by the printing device without being processed by a driver of the printing device, the job retention system being further configured to enable the selected portion of the print-ready information to be printed without printing a non-selected portion of the print-ready information.

17. The print system of claim 16, further comprising:
a printing device having a memory, the print-ready information being stored in the memory of the printing device; and
wherein the job retention system resides in the printing device.

18. The print system of claim 17, further comprising:
a workstation communicatively coupled to the printing device, the workstation having a driver, the driver being configured to convert information into the print-ready information and provide the print-ready information to the printing device, the driver being further configured to provide a graphical user interface, the graphical user interface being configured to enable the user to select at least the portion of the print-ready information.

19. The print system of claim 16, wherein the printing device includes a user interface, the user interface being configured to enable a user to select at least the portion of the print-ready information.

20. The print system of claim 16, wherein the user interface is a graphical user interface.

21. The print system of claim 16, further comprising:
a workstation having a driver configured to provide a graphical user interface, the graphical user interface being configured to enable a user to select at least the portion of the print-ready information.

22. The print system of claim 16, further comprising:
means for storing the information in the print-ready format.

23. The print system of claim 22, wherein the means for storing the information in the print-ready format is a disk drive.

24. The print system of claim 23, further comprising:
a printing device associated with the job retention system; and
wherein the disk drive is a component of the printing device.

25. The print system of claim 23, further comprising:
means for configuring the information corresponding to the print task in the print-ready format.

26. The print system of claim 25, wherein the means for configuring the information is associated with a driver, the driver being configured to receive information in a non-print-ready format and convert the information to the print-ready format.

27. The system of claim 16, wherein the printing device has an input interface, wherein input is received via the input interface.

28. A system, comprising:
a printing device having an input interface; and
a job retention system configured to receive and store print-ready information corresponding to a print task, the job retention system further configured to receive selection information from a user, via the input interface, and configured to select a portion of the print-ready information based upon the selection information, the job retention system further configured to enable the selected portion of the print-ready information to be printed without printing a non-selected portion of the print-ready information.

29. The system of claim 28, wherein the selected portion and the non-selected portion of the print-ready information correspond to a single print task.

30. A printer system, comprising:
memory configured to store print-ready information without further translation by a printer driver indicative of a document to be printed; and
job retention logic configured to receive a selection from a user indicative of a portion of the print task that the user desires to be printed, the job retention logic further configured to integrate with the print ready information a designation identifying the selected portion enabling the selected portion of the print ready information to be printed by a printing device.

31. A printing method comprising:
receiving a print request;
converting information corresponding to the print request from a format that is not print-ready into a print-ready format such that the converted information can be printed by a printing device without being processed by a driver;
selecting a portion of the converted information subsequent to the converting; and
enabling the selected portion of the converted information to be printed without printing a non-selected portion of the converted information.

* * * * *